(12) United States Patent
Nielsen et al.

(10) Patent No.: US 12,490,348 B2
(45) Date of Patent: Dec. 2, 2025

(54) PANE WITH PATTERN FOR HIGH-FREQUENCY TRANSMISSION

(71) Applicant: SAINT-GOBAIN GLASS FRANCE, Courbevoie (FR)

(72) Inventors: Tobias Nielsen, Cologne (DE); Stefan Droste, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 937 days.

(21) Appl. No.: 17/631,302

(22) PCT Filed: Jul. 29, 2020

(86) PCT No.: PCT/EP2020/071382
§ 371 (c)(1),
(2) Date: Jan. 28, 2022

(87) PCT Pub. No.: WO2021/037467
PCT Pub. Date: Mar. 4, 2021

(65) Prior Publication Data
US 2022/0264705 A1   Aug. 18, 2022

(30) Foreign Application Priority Data
Aug. 28, 2019 (EP) .................................. 19193994

(51) Int. Cl.
*H05B 3/84* (2006.01)
*B60J 1/02* (2006.01)
*E06B 3/673* (2006.01)

(52) U.S. Cl.
CPC ............... *H05B 3/84* (2013.01); *B60J 1/02* (2013.01); *E06B 3/673* (2013.01)

(58) Field of Classification Search
CPC .............. B32B 17/10; B32B 17/10005; B32B 17/10036; B32B 17/10165;
(Continued)

(56) References Cited

U.S. PATENT DOCUMENTS

| 4,422,280 A | 12/1983 | Mertin et al. |
| 6,922,175 B2 | 7/2005 | Walton |

(Continued)

FOREIGN PATENT DOCUMENTS

| CN | 104703794 A | 6/2015 |
| CN | 105981473 A | 9/2016 |
| DE | 195 08 042 A1 | 10/1995 |
| DE | 198 17 712 C1 | 2/2000 |
| EP | 0 378 917 A1 | 7/1990 |
| EP | 0 717 459 A1 | 6/1996 |
| EP | 0 847 965 B1 | 10/2004 |
| EP | 1 605 729 A2 | 12/2005 |
| EP | 2 139 049 A1 | 12/2009 |

(Continued)

OTHER PUBLICATIONS

International Search Report as issued in International Patent Application No. PCT/EP2020/071382, Oct. 9, 2020.

*Primary Examiner* — Hung D Nguyen
(74) *Attorney, Agent, or Firm* — Pillsbury Winthrop Shaw Pittman LLP

(57) ABSTRACT

A pane, in particular a vehicle pane, includes at least one first pane with an outer side and an inner side, at least one transparent, electrically conductive coating, which is arranged on the outer side and/or on the inner side of the first pane, and at least one pattern, which is formed by decoated, linear regions within the transparent, electrically conductive coating such that the linear regions are partially in contact with one another and, as a result, form a plurality of electrically isolated zones within the coating, wherein the decoated linear regions have a sinusoidal shape, wherein the pane has regions with different amplitude and/or frequency of the sinusoidal decoated regions.

19 Claims, 4 Drawing Sheets

Figure 1A:
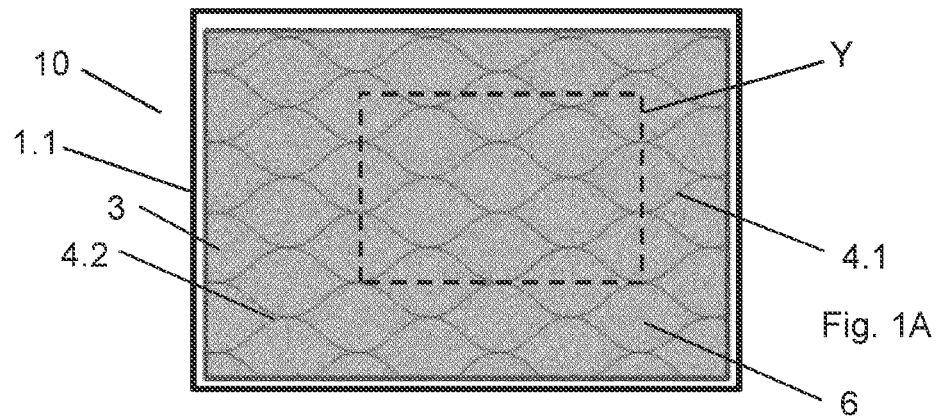

(58) Field of Classification Search
CPC ...... B32B 17/10174; B32B 17/101761; B32B 17/10183; B32B 17/10192; B32B 17/10339; B32B 17/10211; B32B 17/1022; B32B 17/10229; B32B 17/102348; B32B 17/10293; B32B 17/10348; B32B 17/10357; B32B 17/10449; B32B 17/10467; B32B 17/10504; B32B 17/1055; B32B 17/1066; B32B 17/10761; B32B 17/1077; B32B 17/10779; B32B 17/10788; B32B 17/10807; B32B 17/10853; B32B 17/10862; B32B 17/10871; B60J 1/00; B60J 1/001; B60J 1/002; B60J 1/02; B60J 1/06; H05B 3/84; H05B 2203/008; H05B 2203/013; E06B 3/66; E06B 3/673

See application file for complete search history.

(56) References Cited

U.S. PATENT DOCUMENTS

| | | |
|---|---|---|
| 2003/0080909 A1 | 5/2003 | Voeltzel |
| 2013/0295300 A1 | 11/2013 | Paulus |
| 2015/0343884 A1* | 12/2015 | Rousselet ............... B60J 1/002 359/360 |

FOREIGN PATENT DOCUMENTS

| | | |
|---|---|---|
| EP | 3 081 378 A1 | 10/2016 |
| EP | 1 614 325 B1 | 3/2018 |
| JP | 2016-506308 A | 3/2016 |
| JP | 2016-515354 A | 5/2016 |
| KR | 10-2018-0014875 A | 2/2018 |
| WO | WO 2010/043598 A1 | 4/2010 |
| WO | WO 2012/066324 A1 | 5/2012 |
| WO | WO 2014/060203 A1 | 4/2014 |

* cited by examiner

PANE WITH PATTERN FOR HIGH-FREQUENCY TRANSMISSION

CROSS-REFERENCE TO RELATED APPLICATIONS

This application is the U.S. National Stage of PCT/EP2020/071382, filed Jul. 29, 2020, which in turn claims priority to European patent application number 19 193 994.1 filed Aug. 28, 2019. The content of these applications are incorporated herein by reference in their entireties.

The invention relates to a pane, in particular a vehicle pane, with a transparent, electrically conductive coating and low transmission attenuation for electromagnetic radiation in the high-frequency range. The invention further relates to a method for producing such a pane and its use.

Current motor vehicles require a large number of technical devices for transmitting and receiving electromagnetic radiation for the operation of basic services such as radio reception, preferably in the bands AM, FM, or DAB, mobile telephony in the bands GSM 900 and DCS 1800, UMTS and LTE, and 5G as well as satellite-supported navigation (GPS) and WLAN.

At the same time, modern vehicle glazings increasingly have all-sided and full-surface electrically conductive coatings transparent to visible light. These transparent, electrically conductive coatings protect, for example, interiors against overheating due to sunlight or against cooling, by reflecting incident thermal radiation, as is known from EP 378917 A. Transparent, electrically conductive coatings can cause selective warming of the pane by application of an electrical voltage, as is known from WO 2010/043598 A1.

Common to the transparent, electrically conductive coatings is the fact that they are also impermeable to electromagnetic radiation in the high-frequency range. An all-sided and full-surface glazing of a vehicle with transparent, electrically conductive coatings renders transmission and reception of electromagnetic radiation in the interior no longer possible. For the operation of sensors such as rain sensors, camera systems, or fixed antennas, one or two localised regions of the electrically conductive, transparent coating are decoated. These decoated regions form a so-called "communication window" or "data transmission window" and are known, for example, from EP 1 605 729 A2. Since the transparent, electrically conductive coatings affect the colouring and reflectance of a pane, communications windows are optically very conspicuous. Disruptions in the driver's field of vision, which impair driving safety and which must absolutely be avoided, can result from decoated regions. Consequently, communication windows are arranged at inconspicuous positions on the pane, for example, in the region of the inside rearview mirror of a windshield, and are covered by black imprints and plastic screens.

Such communication windows are too small to enable the transmitting and receiving of high-frequency electromagnetic radiation, such as is necessary, for example, for mobile telephony and satellite-supported navigation. Nevertheless, the user expects to be able to operate mobile telephones at any position in the interior of a vehicle.

From EP 0 717 459 A1, US 2003/0080909 A1, and DE 198 17 712 C1, panes with a metallic coating are known, all of which have grid-formed decoating of the metallic coating. The grid-formed decoating acts as a low pass filter for incident high-frequency electromagnetic radiation. The distances between the grid elements are small compared to the wavelength of the high-frequency electromagnetic radiation and thus a relatively large proportion of the coating is patterned and vision through the pane is relatively greatly impaired. The removal of a relatively large proportion of the layer is tedious and cost intensive.

The publications U.S. Pat. No. 6,922,175 B2, EP 1 614 325 B1, and WO 2014/060203 A1 also reveal such grid-formed decoatings, which have in common that they have either angular or rectilinear patterns of decoating. In addition, decoating is usually done only in those regions of a vehicle windshield that are located in the edge regions and, above all, not in the driver's primary field of vision.

From WO 2012/066324 A1, coatings are also known that are formed with decoated linear regions that have a sinusoidal or wavy shape. Such decoatings can be advantageous because they are visually relatively inconspicuous and can be easily and quickly produced by laser decoating.

The object of the present invention now consists in providing a further improved pane having a transparent, electrically conductive coating. The pane should enable sufficient transmission of high-frequency electromagnetic radiation for the operation of mobile telephony in the GSM 900 and DCS 1800, UMTS, and LTE bands as well as satellite-supported navigation (GPS) and other ISM frequencies such as WLAN, garage door opener frequencies, Bluetooth, Car2Car communication, or CB radio, be visually appealing, not substantially restrict vision through the pane, and, above all, be quick and economical to produce. These and other objects are accomplished according to the proposal of the invention by a pane with the features of the independent claims. Advantageous embodiments of the invention are indicated by the features of the subclaims. A method for producing a pane with high-frequency transmission as well as the use of such a pane emerge from other independent claims.

A pane according to the invention comprises at least one first pane with an outer side and an inner side, at least one transparent, electrically conductive coating, which is arranged on the outer side and/or on the inner side of the first pane, and at least one pattern, which is formed by decoated, linear regions within the transparent, electrically conductive coating such that the linear regions are partially in contact with one another and, as a result, form a plurality of electrically isolated zones within the coating, wherein the decoated linear regions have a sinusoidal shape.

Provision is made according to the invention for the decoated regions to have a sinusoidal shape. In the context of the present invention, the term "sinusoidal shape" means, in particular, that the lines of the linear regions have a curvature or have in each case alternatingly different curvatures in the course at least in some sections, and in contrast to the prior art, are not rectilinear. The curvature or curvatures of the decoated regions can run both with a constant angle of curvature as well as with a variable angle of curvature. In particular, the term includes both curved linear regions with a "perfect" sinusoidal shape and curved linear regions with a non-"perfect" sinusoidal shape, in other words, with any wave shape.

The linear decoated regions, which have, according to the invention, a sinusoidal shape or any wave shape, form a plurality of electrically isolated zones within the coating. The size of the area of these zones is a determining factor for the permeability of electromagnetic radiation of certain wavelengths, such as radiation for operating mobile telephony in the bands GSM 900 and DCS 1800, UMTS, LTE, and 5G as well as satellite-supported navigation (GPS) and other ISM frequencies such as WLAN, garage door opener frequencies, Bluetooth, Car2Car communication or CB radio. According to the invention, the size of the area of the zones can be widely varied, on the one hand, by selecting the amplitude and frequency of the sinusoidal decoated regions. On the other hand, the pattern according to the invention allows further variations by the orientation of the sinusoidal decoated lines, by the selection of overlapping regions, and by the offset of the sinusoidal lines relative to the lines previously introduced, in particular in the horizontal direction. In this manner, it is easily possible to optimise transmissivity even for multiple frequency bands at the same time.

The present invention is based on the discovery that a pane according to the invention with non-rectilinear decoated patterns has sufficiently high permeability for high-frequency electromagnetic radiation. It is unnecessary to decoat the transparent, electrically conductive coating overlarge areas. Decoated patterns with only a small line width, which do not substantially impair the optical vision through the pane and the aesthetic appearance of the pane, suffice. Advantageously, the non-rectilinear sinusoidal patterns can result in the fact that fewer interfering field-induced currents can develop. In addition, high permeabilities for high-frequency electromagnetic radiation can be achieved with only very little patterning effort. At the same time, process time and process costs can be kept low. This is primarily due to the fact that during patterning, i.e., during the introduction of the decoated linear regions in the conductive coating of the pane, a continuous and flowing movement of the laser can be carried out without many set-off points and associated repositioning. In this manner, a process time that is several times faster can be achieved. Sinusoidal or any wave-shaped patterns are also less distracting in appearance for a viewer than rectilinear patterns. This is due in particular to the fact that in the case of a sinusoidal or wave-shaped pattern, there are fewer corners, in particular right-angled or even acute-angled corners in the pattern.

For this purpose, the pane according to the invention can be implemented as a single pane comprising a first pane with a transparent, electrically conductive coating.

Alternatively, the pane according to the invention can be implemented as a laminated pane. A laminated pane according to the invention preferably comprises a first pane, an intermediate layer, and a second pane as well as at least one transparent, electrically conductive coating, which is arranged between the intermediate layer and the first pane and/or between the intermediate layer and the second pane. The transparent, electrically conductive coating can also be arranged on a carrier film, which is preferably laminated in via further intermediate layers within the first and the second pane.

The first pane and/or the second pane can be, both in the case of the single pane and also in the case of the laminated pane, a single pane or an already laminated composite pane composed of two or more panes, which form a fixedly bonded unit as a result of the lamination.

In an advantageous embodiment of the pane according to the invention, the sinusoidal decoated regions have, at least in some sections, a uniform amplitude and/or frequency.

In this way, the individual zones can form a uniform grid pattern. Such a uniform grid pattern can be optimised in its permeability for certain wavelengths. According to the invention, this optimisation, and even optimisation for multiple high-frequency signals simultaneously, can be done due to the wide variability of the pattering in terms of amplitudes, frequencies, distances between the wave lines, design of the overlapping regions, and selection of frequency offsets for the adjacent lines. In addition, a uniform pattern offers very high aesthetics, in particular in those cases in which the entire windshield of a vehicle is coated. Due to the wave-shaped or sinusoidal decoated regions and the resultant visually flowing transitions, the grid pattern is less distracting than patterns that are formed by rectilinear decoated regions and thus often have, in particular, right-angled corners. Due to uniform amplitudes and/or frequencies of the sinusoidal decoated regions, very high process speeds can be achieved in the manufacturing process.

The terms "amplitude" and "frequency" of the sinusoidal decoated regions mean, in particular, the length of a wave in the horizontal direction (frequency) and the pitch or pitch depth of a wave in the vertical direction (amplitude). The terms "horizontal" and "vertical" refer to the installation situation of the pane according to the invention, for example, in a vehicle or in a building.

The grid patterns according to the invention act as low-pass filters, in other words, they can be optimised to a cut-off frequency, at which frequencies lower than the cut-off frequency are allowed to pass and above which the transmission of frequencies higher than the cut-off frequency becomes worse. The dimensions of the amplitude and the frequency of the sinusoidal decoated lines that form the grid pattern result from the selection of the cutoff frequency in a manner generally known to the person skilled in the art. The electromagnetic transmission is affected by them in each direction, in other words, the smaller the maximum distance between the lines in each direction, the higher the cut-off frequency up to which the transmission remains unaffected. When, for example, the maximum distance in the vertical direction is 2.0 mm and in the horizontal direction is 5.0 mm between the decoated regions, the resulting cut-off wavelength can be estimated to be up to 20 times these values. Thus, the cut-off wavelength would be up to approx. 40 mm in the vertical direction and up to approx. 100 mm in the horizontal direction, and, correspondingly, there would be a frequency of 7.5 GHz or 3 GHz for the cut-off wavelength, depending on the direction of polarisation. For the related correlations and estimates, reference is made to the description of DE 195 08 042 A1. In principle, however, any polarisation can be transmitted.

Alternatively, but also advantageously, the sinusoidal decoated regions can have, at least in some sections, a variable amplitude and/or frequency.

In this way, a nonuniform grid pattern can be formed by the individual zones with variable amplitudes and/or frequencies. Various embodiments are conceivable. For example, a regular sequence of different amplitudes and/or frequencies can be used to achieve optimisation of permeability even for different wavelengths. An irregular sequence of amplitude or frequency change can, for example, be used to achieve optimised permeability in certain regions of the windshield, for one wavelength in each case. It is also possible to provide, in particular in the region of the driver's field of vision, a significantly increased amplitude and/or frequency of the sinusoidal decoated regions in order to provide, for this region, a further improved view and fewer distracting patterning lines. Nevertheless, the windshield can be processed as a whole or over a very large area during production in the coating step and in the introduction of the decoatings, as a result of which costly precautions for masking the regions that are not to be coated and constant removal and repositioning of the decoating can be eliminated.

The pane has regions (zones) with different amplitude and/or frequency of the sinusoidal decoated regions regions.

This means that at least two subregions of the pane exist with the amplitude and/or the frequency of the sinusoidal decoated regions in the first subregion differing from the amplitude and/or the frequency of the sinusoidal decoated regions in the second subregion. The pane can also have more than two subregions with different amplitude and/or frequency. Within the subregions, the amplitude and the frequency are preferably uniform and constant. By means of different subregions with different frequency and/or amplitude, it is possible to provide the pane with permeability to electromagnetic radiation in different frequency ranges.

It is possible for the regions with different, but inherently constant amplitude and/or frequency to be directly adjacent one another such that the change in amplitude and/or frequency occurs abruptly. However, it can be preferable for the regions to be separated from one another by a transition zone, wherein the amplitude and/or frequency changes continuously to create a smooth transition (in terms of the amplitude and/or frequency of the sinusoidal decoated lines) between the two regions. The pattern of the decoated lines is then particularly inconspicuous.

It is particularly advantageous for the amplitude to be greater in a central region (through-vision region) of the pane and/or for the frequency in a central region of the pane to be smaller than in an edge region. The central region has greater distance from the side edge of the pane than the edge region. Since a greater amplitude as well as a lower-frequency results in lower density of the decoated lines, the decoated lines are less visually conspicuous in the central region and are perceived as less distracting. This is advantageous because through-vision through the pane occurs primarily in the central through-vision region.

Regulation No. 43 of the Economic Commission for Europe of the United Nations (UN/ECE) (ECE-R43, "Uniform Provisions Concerning the Approval of Safety Glazing Materials and Their Installation on Vehicles") defines central fields of vision for windshields of various vehicles. For vehicles of category M1 (vehicle passenger transport with at most eight seats in addition to the driver's seat), which also includes passenger cars, the field of vision A and the larger field of vision B containing it are defined. For vehicles of category M, other than M1 (other vehicles for passenger transport), and for vehicles of category N (vehicles for freight transport), a field of vision I is defined. In said central fields of vision, particularly high requirements are made for the quality of the pane, in particular in terms of its transmittance, the most distortion-free view possible, and the least possible interference with through-vision. Consequently, in an advantageous embodiment, said central field of vision with the greater amplitude and/or the lower frequency of the decoated lines is the field of vision A or the field of vision B according to ECE-R43 (if the pane is a windshield or component of a windshield of the vehicle of category M1, in particular of a passenger car), is the field of vision I according to ECE-R43 (if the pane is a windshield or component of a windshield of a vehicle of category M, other than M1, or of category N).

This advantageously minimises the visual conspicuousness of the de coated lines in the central through-vision region. In the region outside these central fields of vision, there is completely or partially, a lower amplitude or a higher-frequency of the decoated lines.

In the case of a windshield for a vehicle of M1 (in particular of a passenger car), provision can also be made for there to be, in the field of vision A, a greater amplitude and/or a lower frequency than in the region of the field of vision B, which surrounds the field of vision A, and for there to be in turn, in this region of the field of vision B, a greater amplitude and/or a lower frequency than outside the field of vision B.

In a particularly advantageous embodiment, the pane has subregions with different amplitude of the sinusoidal decoated linear regions. Preferably, the amplitude in a central region is greater than in an edge region, whereby, in the case of a windshield, said central region is particularly preferably one of the aforementioned fields of vision according to ECE-R43. In the region with greater amplitude, the number of decoated linear region [sic] is smaller than in the region with smaller amplitude. If there are more than two of said regions, the number of decoated lines is preferably greater the smaller their amplitude. In particular, it is advantageous if, in the region with greater amplitude, such linear regions partially contact one another, their extensions in the region with smaller amplitude do not contact one another, but are separated from one another by interposed further decoated lines, which they in turn partially contact. Said interposed further decoated lines are not continued in the region with greater amplitude, resulting in a reduction in the number of decoated lines.

In another advantageous embodiment of the pane according to the invention, the line width d of the decoated regions is from 5 μm to 500 μm and preferably 10 μm to 140 μm. The line width can be, for example, from 25 μm to 500 μm or from 30 μm to 140 μm. such line widths are technically easy to produce, for example, by laser patterning. Furthermore, they hardly impair the optical view through the pane.

In another advantageous embodiment of the pane according to the invention, the transparent, electrically conductive coating has at least four zones, preferably 10 to 150 zones, and the zones are preferably arranged horizontally and/or vertically. With such a distribution of the decoated lines, particularly low transmission attenuation and favourable distribution of received and transmitted power behind the pane can be achieved. A region with horizontally and/or vertically arranged decoated patterns can have, even in its entirety, an angle α relative to the horizontal, for example, of 10° to 80° and preferably from 30° to 50°.

In an advantageous embodiment of the pane according to the invention, the area of the zones has an area proportion of 25% to 95% of the pane. Alternatively, but equally advantageously, the area proportion of the zones can also be greater than 95% and preferably be 100%, in other words, the zones span the entire area of the pane. With this area proportion, particularly low transmission attenuation and favourable distribution of the received and transmitted power behind the pane can be achieved. At the same time, a favourable ratio of improvement in transmission relative to processing costs for decoating can be established since possibly necessary masking of the regions not to be coated can be eliminated.

In an advantageous embodiment of the invention as a windshield, the regions with the decoated patterns are arranged outside the driver's field of vision A. The driver's field of vision A is defined, for example, according to Annex 18 ECE R43. Although the line widths of the decoated patterns according to the invention are very thin and, consequently, visually inconspicuous, is important to avoid any interference in the driver's field of vision.

The number of regions and decoated patterns is governed by the transmission attenuation requirements and the dimensions of the pane. In the case of a windshield, the size and configuration of the interior must be taken into account.

In an advantageous embodiment of the pane according to the invention, the first pane and/or a second pane contains glass, preferably flat glass, float glass, quartz glass, borosilicate glass, soda lime glass, or polymers, preferably polyethylene, polypropylene, polycarbonate, polymethyl methacrylate, and/or mixtures thereof. Suitable types of glass are known, for example, from EP 0 847 965 B 1.

The thickness of the pane pane can vary widely and thus be ideally adapted to the requirements of the individual case. Preferably, panes with the standard thicknesses from 1.0 mm to 25 mm and preferably from 1.4 mm to 2.1 mm are used. The size of the pane can vary widely and is governed by the size of the use according to the invention.

In an advantageous embodiment of the invention, the pane has dielectric properties and a relative permittivity from 2 to 8. A pane made of polymers preferably has a relative permittivity from 2 to 5. A pane made of glass preferably has a relative permittivity from 6 to 8 and in particular of roughly 7.

The pane can have any three-dimensional shape. Preferably, the three-dimensional shape has no shadow zones such that it can, for example, be coated by cathodic sputtering. Preferably, the pane is planar or slightly or greatly curved in one or more spatial directions. The pane can be colourless or coloured.

The transparent, electrically conductive coating according to the invention is permeable to electromagnetic radiation, preferably electromagnetic radiation of a wavelength from 300 to 1,300 nm, in particular to visible light. The term "permeable" means that the total transmittance of the laminated pane complies with the legal requirements for windshields and front side windows and is permeable in particular to visible light preferably >70% and in particular >75%. For rear side windows and rear windows "permeable" can also mean 10% to 70% light transmittance.

The transparent, electrically conductive coating is preferably a functional coating, particularly preferably a functional coating with anti-sunlight protection. A coating with anti-sunlight protection has reflecting properties in the infrared range and thus in the range of sunlight. Thus, the heating of the interior of a vehicle or building as a result of sunlight is advantageously reduced. Such coatings are known to the person skilled in the art and typically contain at least one metal, in particular silver or a silver-containing alloy. The transparent, electrically conductive coating can include a sequence of a plurality of individual layers, in particular at least one metallic layer and dielectric layers that include, for example, at least one metal oxide. The metal oxide preferably contains zinc oxide, tin oxide, indium oxide, titanium oxide, silicon oxide, aluminium oxide, or the like, as well as combinations of one or a plurality thereof. The dielectric material can also contain silicon nitride, silicon carbide, or aluminium nitride.

This layer structure is generally obtained by a sequence of deposition procedures that are performed by a vacuum method, such as magnetic field enhanced cathodic sputtering. Very fine metal layers, which contain, in particular, titanium or niobium, can also be provided on both sides of the silver layer. The lower metal layer serves as an adhesion and crystallisation layer. The upper metal layer serves as a protective and getter layer to prevent a change in the silver during the other process steps.

In another advantageous embodiment, the transparent, electrically conductive coating includes at least one metal, preferably silver, nickel, chromium, niobium, tin, titanium, copper, palladium, zinc, gold, cadmium, aluminium, silicon, tungsten, or alloys thereof, and/or at least one metal oxide layer, preferably tin-doped indium oxide (ITO), aluminium-doped zinc oxide (AZO), fluorine-doped tin oxide (FTO, $SnO_2$:F), antimony-doped tin oxide (ATO, $SnO_2$:Sb), and/or carbon nanotubes and/or optically transparent, electrically conductive polymers, preferably poly(3,4-ethylenedioxy-thiophenes), polystyrene sulfonate, poly(4,4-dioctylcylo-pentadithiophene), 2,3-dichloro-5,6-dicyano-1,4-benzoquinone, mixtures, and/or copolymers thereof, and/or the transparent, electrically conductive coating has sheet resistance of 0.35 ohm/square to 200 ohm/square, preferably 0.6 ohm/square to 30 ohm/square.

The thickness of the transparent, electrically conductive coating can vary widely and can be adapted to the requirements of the individual case. It is essential that the thickness of the transparent, electrically conductive coating not be so great that it becomes impermeable to electromagnetic radiation, preferably electromagnetic radiation of a wavelength from 300 to 1,300 nm and in particular visible light. The transparent, electrically conductive coating preferably has a layer thickness from 10 nm to 5 µm and particularly preferably from 30 nm to 1 µm.

The sheet resistance of the transparent, electrically conductive coating is preferably from 0.35 ohm/square to 200 ohm/square, preferably 0.5 ohm/square to 200 ohm/square, most particularly preferably from 0.6 ohm/square to 30 ohm/square, and, in particular, from 2 ohm/square to 20 ohm/square. The transparent, electrically conductive coating can, in principle, have even lower sheet resistances than 0.35 ohm/square, in particular if, in its use, only a low light transmittance is required. The transparent, electrically conductive coating preferably has good infrared reflecting properties and/or particularly low emissivity (low-E).

The invention further relates to a laminated pane at least comprising: a pane according to the invention as described above and a second pane that is laminarily joined to the pane at least in some sections via at least one intermediate layer.

In a preferred embodiment of the pane according to the invention as a laminated pane, at least one of the panes contains glass and at least one of the panes contains plastic. In particular, in the case of a use according to the invention as a vehicle pane, the outer pane contains glass and the inner pane contains plastic.

The panes of the laminated pane are joined to one another by at least one intermediate layer. The intermediate layer preferably contains a thermoplastic, such as polyvinyl butyral (PVB), ethylene vinyl acetate (EVA), polyurethane (PU), polyethylene terephthalate (PET), or multiple layers thereof, preferably with thicknesses of 0.3 mm to 0.9 mm.

In an advantageous embodiment of the laminated pane according to the invention, at least one transparent, electrically conductive layer is situated on at least one of the inner sides of the panes. In the case of a pane composite made of two panes, a transparent, electrically conductive layer can be situated on the inner side of one or the other pane. Alternatively, a transparent, electrically conductive layer can, in each case, be situated on each of the two inner sides. In the case of a pane composite made of more than two panes, multiple transparent, electrically conductive coatings can also be situated on multiple inner sides of the panes. In that case, the regions with decoated patterns are preferably arranged congruently in the different coatings in order to ensure low transmission attenuation.

The invention further relates to a method for producing a pane, wherein at least:
a. the transparent, electrically conductive coating is applied to the outer side and/or to the inner side of a first pane, and b. at least one electrically isolated zone having at least two linear decoated regions is introduced into the transparent, electrically conductive coating, wherein the at least two regions are partially in contact with one another and are sinusoidally shaped.

Application of the transparent, electrically conductive coating in process step (a) can be done using methods known per se, preferably by magnetic field enhanced cathodic sputtering. This is particularly advantageous with regard to simple, rapid, economical, and uniform coating of the first pane. The transparent, electrically conductive coating can, however, also be applied, for example, by vapour deposition, chemical vapour deposition (CVD), plasma enhanced chemical vapour deposition (PECVD), or by wet chemical methods.

The first pane can be subjected to a temperature treatment after process step (a). The first pane with the electrically conductive coating is heated to a temperature of at least 200° C., preferably at least 300° C. The temperature treatment can serve to increase transmittance and/or to reduce the sheet resistance of the transparent, electrically conductive coating.

The first pane can be bent after process step (a), typically at a temperature from 500° C. to 700° C. Since it is technically simpler to coat a flat pane, this approach is advantageous when the first pane is to be bent. Alternatively, the first pane can, however, also be bent before process step (a), for example, if the transparent, electrically conductive coating is unsuitable to withstand a bending process without damage.

The decoating of the decoated patterns in the transparent, electrically conductive coating is preferably done by a laser beam. Methods for patterning thin metal films are known, for example, from EP 2 200 097 A1 or EP 2 139 049 A1. The width of the decoating is preferably 5 µm to 500 µm, particularly preferably 10 µm to 300 µm, most particularly preferably 10 µm to 140 µm, and in particular 70 µm to 140 µm. In this range, a particularly clean and residue-free decoating takes place using the laser beam. The decoating by means of laser beam is particularly advantageous since the decoated lines are visually very unobtrusive and the appearance and the vision through the pane are impaired only little. The decoating of a line of the width d, which is wider than the width of a laser cut, is done by multiple passes of the line with the laser beam. Consequently, process duration and process costs rise with an increasing line width. Alternatively, the decoating can be done by mechanical ablation as well as by chemical or physical etching.

In an advantageous embodiment of the method according to the invention, the decoated pattern is introduced into the transparent, electrically conductive coating by laser patterning.

In particular in the case of laser patterning, significant time savings can be achieved in the introduction of the sinusoidal or wave-shaped decoating according to the invention. This is based not least on the fact that the sinusoidal lines of the decoating regions according to the invention require significantly fewer repositionings of the lasers. Due to the elimination of, in particular, acute-angled corners in the decoating path, the speed of the scanner mirrors for the laser path can be increased compared to the previously known patterns, since the speed had to be slowed down considerably, in each case, at the corners to be introduced in order to cleanly carry out the sharp change of direction.

In addition, as a further advantage of the method according to the invention, very precise and variable optimisation of transmissivities can be achieved in a simple manner, since the variation and adaptation of the amplitudes and frequencies of the sinusoidal decoating regions and also the respective distances between the decoating lines as well as the offset of subsequent lines relative to the lines already introduced can be implemented very easily in terms of process technology. Such variation and adaptation procedures are much more complex to implement in the laser ablation process in the case of previously known effective patterns such as concentric hexagonal patterns or diamond-shaped patterns.

In another advantageous embodiment of the method, in step a), the transparent, electrically conductive coating is applied to a carrier layer, and the carrier layer is laminarily joined to the first pane, preferably via an intermediate layer.

In this embodiment of the method according to the invention, the transparent, electrically conductive coating can be applied on a carrier film, for example, a PET film. The carrier film can be bonded to the first pane directly or via at least one intermediate layer. The region with the decoated patterns can be introduced into the transparent, electrically conductive coating before or after the bonding to the first pane.

In another embodiment of the method according to the invention, a transparent, electrically conductive coating can be embedded between two thermoplastic intermediate layers. In that case, the transparent, electrically conductive coating is preferably applied to a carrier film or carrier pane. The carrier film or carrier pane preferably contains a polymer, in particular polyvinyl butyral (PVB), ethylene vinyl acetate (EVA), polyurethane (PU), polyethylene terephthalate (PET), or combinations thereof.

The invention further extends to the use of a pane as described above or a corresponding laminated pane as a glazing with low transmission attenuation for high-frequency electromagnetic radiation, in a vehicle body or a vehicle door of a means of transportation on land, on water, or in the air, preferably as a windshield, in buildings as part of an external façade or as a building window and/or as a built-in part in furniture and appliances.

The use of a pane according to the invention as a windshield is particularly advantageous. Mobile telephone transmission stations are, for example, installed along highways or expressways. The high-frequency, electromagnetic radiation can then arrive in the driving direction from the front through the windshield according to the invention into the interior of the motor vehicle. In cities, the mobile telephone transmission stations ae customarily installed on roofs or elevated positions and beam down from above. Satellite navigation signals likewise radiate down onto a vehicle from above. Since, to improve aerodynamics, windshields have a sharply inclined installed position, mobile telephone signals or satellite navigation signals can also enter the vehicle interior, in particular from above, through the pane according to the invention.

Figure 1B:
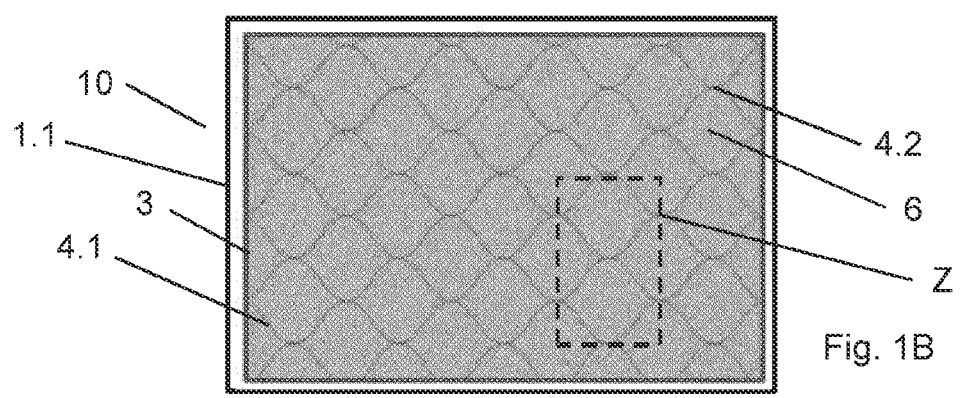
Figure 1C:
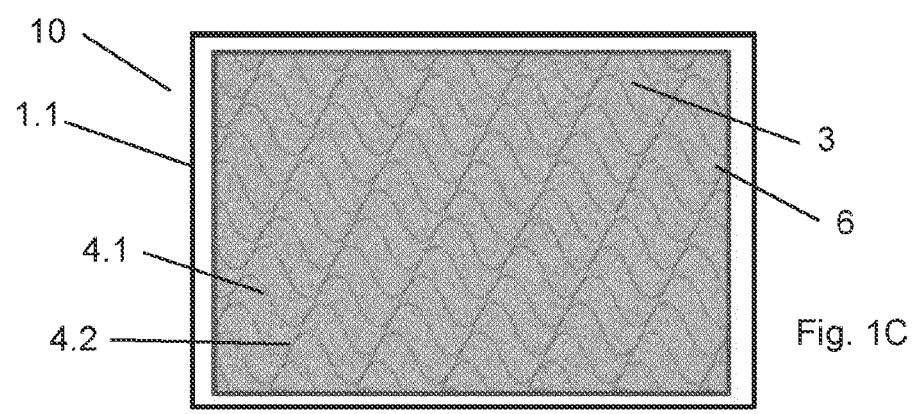
Figure 1D:
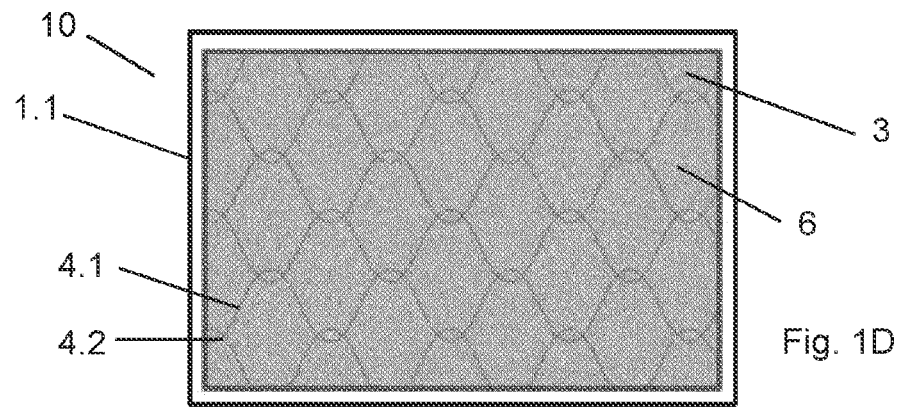
Figure 2A:
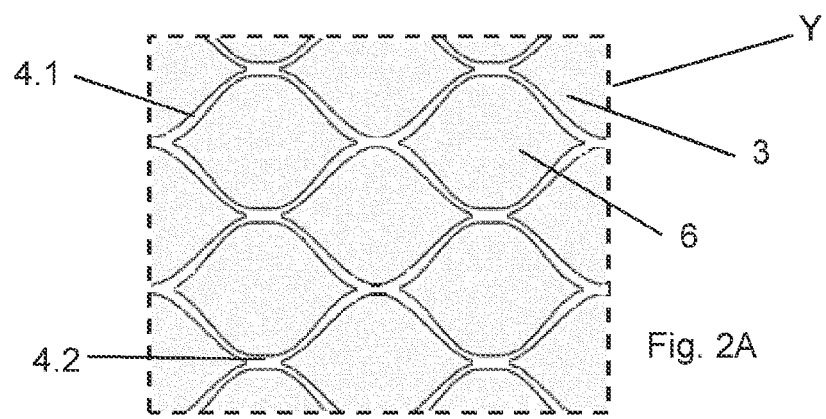
Figure 2B:
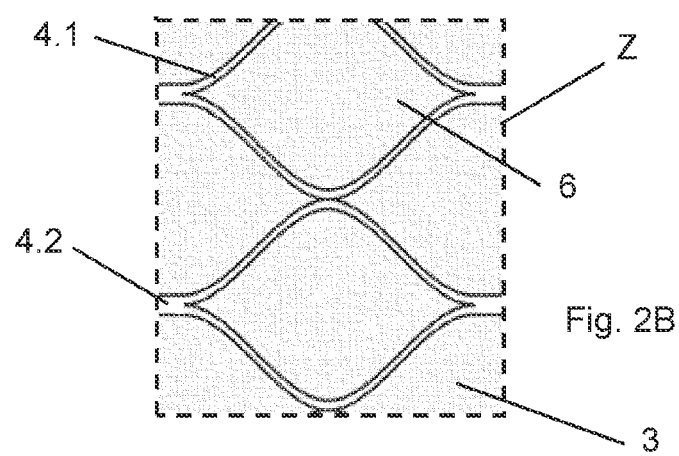
Figure 3:
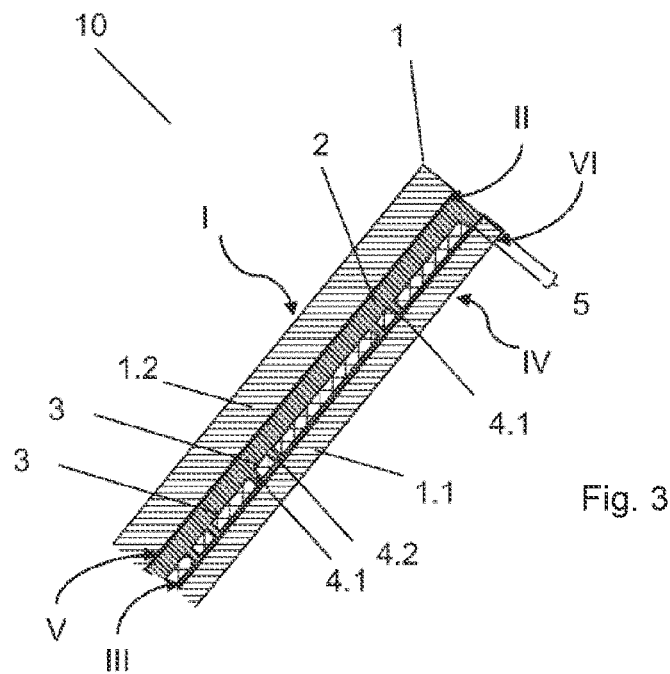
Figure 4:
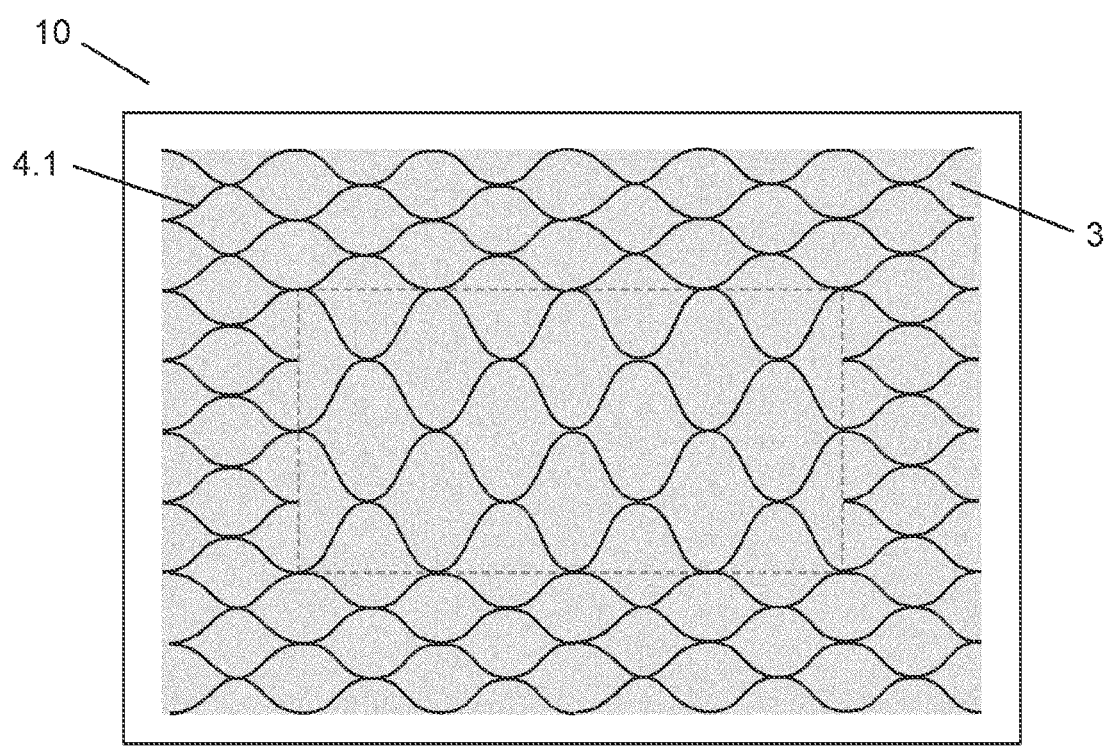
Figure 5:
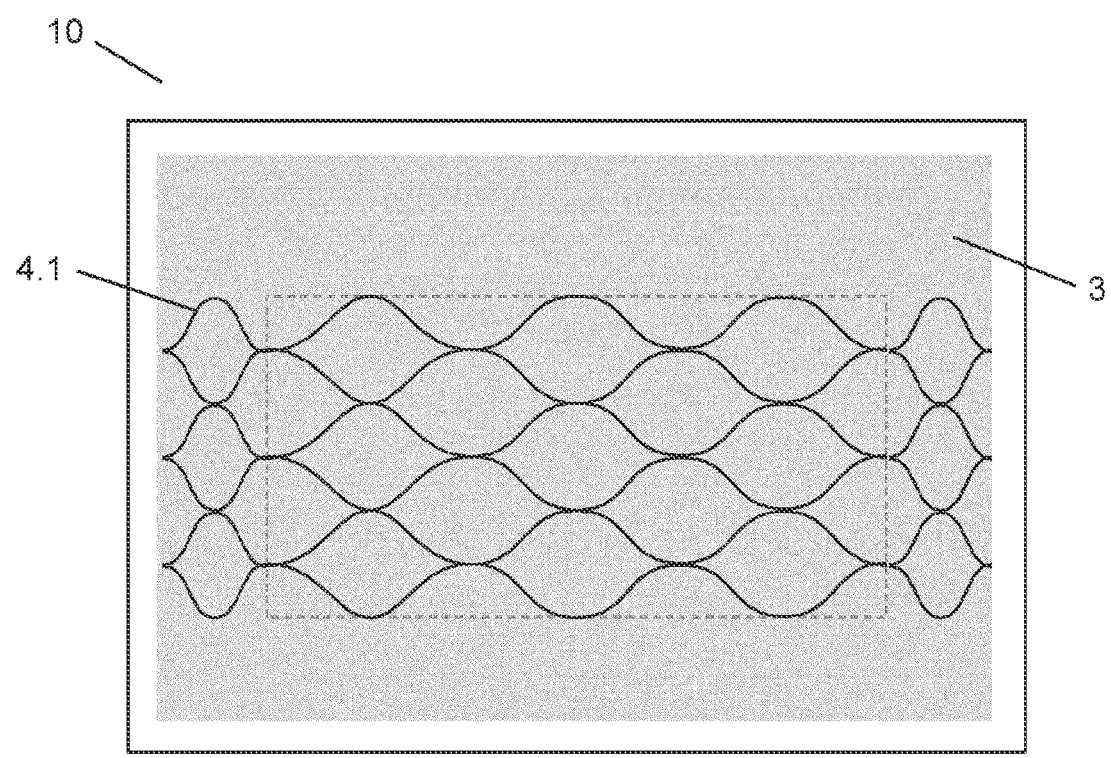

The invention is explained in detail in the following with reference to drawings and an example. The drawings are not completely true to scale. The invention is in no way restricted by the drawings. They depict:

FIG. 1A a schematic representation of a pane according to the invention in plan view, FIG. 1B a schematic representation of an alternative exemplary embodiment of a pane according to the invention in plan view, FIG. 1C a schematic representation of an alternative exemplary embodiment of a pane according to the invention in plan view, FIG. 1D a schematic representation of an alternative exemplary embodiment of a pane according to the invention in plan view, FIG. 2A an enlarged representation of the detail Y of the pane according to the invention of FIG. 1A, FIG. 2B an enlarged representation of the detail Z of the pane according to the invention of FIG. 1B, FIG. 3 a cross-sectional representation of an exemplary embodiment for a laminated pane according to the invention, FIG. 4 a schematic representation of another exemplary embodiment of a pane according to the invention in plan view, and FIG. 5 a schematic representation of another exemplary embodiment of a pane according to the invention in plan view.

FIGS. 1A, 1B, 1C, and 1D depict in each case a schematic representation of a pane 10 according to the invention. The pane 10 comprises a first pane 1.1, on the outer side of which a transparent electrically conductive coating 3 is arranged. The transparent, electrically conductive coating 3, as depicted in FIG. 1 A, has a grid pattern that is formed by sinusoidal decoated regions 4.1. Along the decoated pattern 4.1, there is no transparent, electrically conductive coating 3 or the transparent, electrically conductive coating 3 has been removed, for example, by laser patterning. Due to the identical amplitude and frequency of the sinusoidal decoated regions, a very regular or uniform grid pattern is formed. The decoated linear regions 4.1 contact each other partially in the regions 4.2 and thus form a plurality of electrically isolated zones 6 within the coating 3, which, together, give the optical impression of a grid with curved, flowing lines almost over the entire area of the pane. As a result of the decoated pattern 4.1, the transparent, electrically conductive coating 3, which is otherwise impermeable to high-frequency electromagnetic radiation, becomes permeable. The decoated patterns 4.1, 4.2 are, for example, decoated by laser patterning and have only a very small line width of, for example, 0.1 mm. Through-vision through the pane 10 according to the invention is not significantly impaired and the decoated patterns 4.1, 4.2 are hardly discernible.

FIG. 1B schematically depicts an alternative, but very similar embodiment of the pane 10 according to the invention. In contrast to the variant of FIG. 1A, the sinusoidal decoated linear regions 4.1 and thus also the contact regions 4.2 as well as the resultant zones 6 have greater amplitude of the decoating lines 4.1 in the transparent, electrically conductive coating 3.

FIG. 1C schematically depicts another alternative embodiment of the pane 10 according to the invention. In contrast to the variant of FIGS. 1A and 1B, the sinusoidal decoated linear regions 4.1 and thus also the resultant zones 6 have a continuing wave pattern of the decoating lines 4.1 in the transparent, electrically conductive coating 3. The contact regions 4.2, in which the decoated linear regions 4.1 touch each other are larger in this embodiment than in the more point-shaped contact regions 4.2 of the previous embodiments. The maxima and minima of the sinusoidal decoating lines 4.1 are, in each case, arranged on a line oriented at an angle relative to the horizontal and vertical axes of the pane. As a result, optimised transmission for certain wavelengths, for example, for the standardised mobile radio frequencies, can be achieved. In addition, this can ensure formation of fewer disruptive field-induced currents.

FIG. 1D schematically depicts another alternative embodiment of the pane 10 according to the invention. In contrast to the variant of FIGS. 1A and 1B, the sinusoidal decoated linear regions 4.1 have a different overlapping pattern and thus a larger number of contact regions 4.2. As a result of the different pattern, in particular in terms of the overlaps and contact points, the patterning in this case comprises two differently sized types of zones 6 electrically isolated from one another. This variant also enables reducing electrically induced currents. At the same time, the number of sinusoidal decoated regions 4.1 to be introduced into the electrically conductive coating 3 can be reduced while maintaining the same effect. As a result, a further increase in the process speed can be achieved.

FIG. 2A schematically depicts an enlargement of the detail Y of FIG. 1A. The linear decoated regions 4.1 with the sinusoidal shape provided according to the invention are introduced into the electrically conductive coating 3. In other words, there is no electrically conductive coating in the regions 4.1 and these regions are therefore electrically insulating. The linear decoated regions 4.1 make contact with each other in the regions 4.2. As a result, electrically isolated island-like zones 6 are formed in the conductive coating 3, which zones, in turn, have the conductive coating 3 within their area.

FIG. 2B schematically depicts an enlargement of the detail Z of FIG. 1B. In contrast to the embodiment depicted in FIG. 2A, fewer pronounced overlaps of the sinusoidal decoated regions 4.1 are provided in the horizontally formed contact regions. Nevertheless, the electrically isolated zones 6 with the still present electrically conductive coating 3 are retained.

FIG. 3 is a schematic representation of a pane 10 according to the invention using the example of a vehicle windshield as a laminated pane in a cross-sectional view. The pane 10 is, without restricting the invention, optimised for the transmission of mobile radio radiation in the GSM 900 band. The pane 10 comprises a laminated pane 1 composed of two individual panes, namely a rigid first pane 1.1 and a rigid second pane 1.2, which are fixedly bonded to each other via a thermoplastic intermediate layer 2. The individual panes 1.1, 1.2 have roughly the same size and are made, for example, of glass, in particular float glass, cast glass, and ceramic glass, being equally possibly made of a non-glass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). In general, any material with adequate transparency, sufficient chemical resistance, as well as suitable shape and size stability can be used. For another type of use, for example, as a decorative part, it would also be possible to produce the first pane 1.1 and the second pane 1.2 from a flexible and/or a non-transparent material. The respective thickness of the first pane 1.1 and of the second pane 1.2 can vary widely depending on the use and can be, in the case of glass, for example, in the range from 1 to 24 mm. In the present example, the first pane 1.1 has a thickness of 2.1 mm; and the second pane 1.2, a thickness of 1.8 mm.

The pane faces are identified with the Roman numerals I-IV, where side I corresponds to the outer side of the second pane 1.2, side 11 to the inner side of the second pane 1.1, side III to the outer side of the first pane 1.1, and side IV to the inner side of the first pane 1.1 of the laminated pane 1. In the context of the present invention, "outer side" is the side of a pane that faces the exterior of the vehicle. "Inner side" is the side of a pane that faces the interior of the vehicle. In the use as a windshield, the side I faces the external environment and the side IV faces the passenger compartment of the motor vehicle. Of course, the side IV can also face outward and the side I can face the passenger compartment of the motor vehicle.

The intermediate layer 2 for the bonding of the first pane 1.1 and the second pane 1.2 preferably contains an adhesive plastic, preferably based on polyvinyl butyral (PVB), ethylene vinyl acetate (EVA), or polyurethane (PU).

The laminated pane 1 is transparent to visible light, for example, in the wavelength range from 350 nm to 800 nm, with the term "transparency" understood to mean light permeability of more than 50%, preferably more than 70%, and in particular preferably more than 75%.

The relative permittivity of the panes 1.1,1.2 of the laminated pane 1 is, for panes made of float glass, from 6 to 8 and, for example, 7.

In the example presented, the transparent, electrically conductive coating 3 is applied on the side III of the inner first pane 1.1 facing the intermediate layer 2. The transparent, electrically conductive coating 3 serves, for example, as an infrared reflecting layer of the laminated pane 1. This means that the proportion of thermal radiation of incident sunlight is largely reflected. With the use of the laminated pane 1 in a vehicle, this provides for reduced heating of the interior by sunlight. The transparent, electrically conductive coating 3 is known, for example, from EP 0 847 965 B1 and includes two silver layers that are embedded in each case between a plurality of metal and metal oxide layers. The transparent, electrically conductive coating 3 has a sheet resistance of roughly 4 ohm/square. The transparent, electrically conductive coating 3 can also serve as an electrically heatable coating and can be contacted by means of known bus bars and can be connected to a voltage source. The transparent, electrically conductive coating 3 can, for example, also be a so-called "low-E" layer and have low emissivity for infrared radiation. In that case, the transparent, electrically conductive coating 3 contains or is made of, for example, an indium tin oxide (ITO) layer with a sheet resistance of 20 ohm/square. The indium tin oxide layer is implemented inert relative to environmental influences and scratch resistant such that the indium tin oxide layer can be arranged, for example, on the surface of a side window of a motor vehicle facing a vehicle interior. Alternatively, a scratch and corrosion sensitive coating 3 or a heatable transparent, electrically conductive coating 3 through which current flows can be protected by an insulating layer that contains, for example, a polymer film, such as polyethylene terephthalate (PET) or polyvinyl fluoride (PVF). Alternatively, the transparent, electrically conductive coating 3 can have an insulating and scratch resistant cover layer of inorganic oxides, such as silicon oxide, titanium oxide, tantalum pentoxide, or combinations thereof.

The transparent, electrically conductive coating 3 can, nevertheless, be arranged on the side II of the outer, second pane 1.2 facing the thermoplastic intermediate layer 2, or on the two interior pane sides II and Ill. The transparent, electrically conductive coating 3 can be arranged additionally or exclusively on one of the outer sides I and IV or both outer sides I and IV of the laminated pane 1.

The transparent, electrically conductive coating 3 is applied on the entire first pane 1.1, minus an edge decoated region 5. The edge decoating in the region 5 prevents contact of the transparent, electrically conductive coating 3, which is advantageous with corrosion-sensitive coatings. Moreover, the second pane 1.2 is provided, for example, with an opaque ink layer that is applied on the side II and forms a frame-like perimetral masking strip, which is not shown in detail in the figures. The ink layer consists, preferably, of an electrically nonconductive black-coloured material, which can be fired into the first pane 1.1 or the second pane 1.2. On the one hand, the masking strip obstructs the view of an adhesive strand with which the laminated pane 1 is glued into the vehicle body; on the other, it serves as UV protection for the adhesive material used.

The line width of the decoating of the decoated patterns 4.1,4.2 is essentially constant and is, for example, 100 µm. Such small line widths are hardly perceptible visually to the eye and do not impair vision through the pane 10, such that the pane 10 is suitable for use as a windshield in a vehicle.

Due to the sinusoidal configuration according to the invention of the linear decoated regions 4.1 and the associated lower optical influence on the field of vision, the pattern and thus the isolated zones can be arranged over almost the entire area of the windshield, including the driver's Afield of vision in accordance with Annex 18 of ECE-R43. As a result, the permeability to electromagnetic radiation according to the invention within the vehicle interior can be increased compared to the previously known patterns with rectilinear decoatings. An improvement in permeability can be achieved in particular at the lower edge of the pane 10, and thus the reception and transmission power of sensors, for example, GPS sensors installed in the dashboard can be improved in addition to the permeability for mobile radio signals.

FIG. 4 depicts another embodiment of the invention. The pane 10 is provided with a conductive coating 3, into which the sinusoidal decoated linear regions 4.1 according to the invention are introduced. In a central region of the pane 10, which is indicated by a dashed gray line, the linear regions 4.1 have a greater amplitude than in the edge region, in this example in particular, approx. twice the amplitude. As a result of two regions having different amplitudes, the pane 10 becomes permeable to electromagnetic radiation in a larger frequency range.

The number of linear region [sic] 4.1 is smaller in the central region than in the edge region. In the central region, linear regions 4.1, whose continuations in the edge region are separated from one another in each case by two interposed linear regions 4.1, make contact with each other. These interposed linear regions 4.1 end at the edge of the central region. As a result of the greater amplitude of the remaining linear regions 4.1, the zone of the discontinuous linear regions 4.1 is, so to speak, bridged.

Due to the smaller number of linear regions 4.1 and their greater amplitude, the density of the linear regions 4.1 is lower in the central region of the pane 10. Consequently, the through-vision in the central region is less disturbed than in the edge region, which is particularly advantageous.

The change in amplitude need not occur abruptly at the boundary of the central region, as depicted in the figure. A transition region can be provided, in which the amplitude increases continuously.

If the pane 10 is a windshield of a passenger car, the central region with the greater amplitude can, for example, be the field of vision B according to ECE-R43.

FIG. 5 depicts another embodiment of the invention. The pane 10 is provided with a conductive coating 3, into which the sinusoidal decoated linear regions 4.1 according to the invention are introduced. In a central region of the pane 10, which is indicated by a dashed gray line, the linear regions 4.1 have a smaller frequency than in the edge region. As a result of two regions having different frequencies, the pane 10 becomes permeable to electromagnetic radiation in a larger frequency range.

Due to the lower-frequency of the sinusoidal linear regions 4.1, the density of the linear regions 4.1 is lower in the central region of the pane 10. Consequently, the through-vision in the central region is less disturbed than in the edge region, which is particularly advantageous. The change in frequency need not occur abruptly at the boundary of the central region as depicted in figure. A transition region in which the frequency becomes continuously smaller can be provided.

LIST OF REFERENCE CHARACTERS

10 pane
1.1 first pane
1.2 second pane
2 intermediate layer
3 conductive coating
4 pattern
4.1, 4.2 linear regions
5 decoated edge
6 isolated zones
I outer side
IV inner side

The invention claimed is:

1. A pane, comprising:
at least one first pane with an outer side and an inner side,
at least one transparent, electrically conductive coating, which is arranged on the outer side and/or on the inner side of the first pane, and
at least one pattern, which is formed by decoated, linear regions within the transparent, electrically conductive coating such that the decoated linear regions are partially in contact with one another and, as a result, form a plurality of electrically isolated zones within the at least one transparent, electrically conductive coating,
wherein the decoated linear regions have a sinusoidal shape,
wherein the pane has regions with different amplitude and/or frequency of the sinusoidal decoated regions, and
wherein in a central region, the sinusoidal decoated regions have a greater amplitude and/or a lower frequency than in an edge region.

2. The pane according to claim 1, which is a windshield or a component of a windshield, wherein said central region is the field of vision A, the field of vision B, or the field of vision I according to ECE-R43.

3. The pane according to claim 1, wherein the pane has regions with different amplitude of the sinusoidal decoated regions, and wherein a number of sinusoidal decoated regions is smaller in a region with greater amplitude than in a region with smaller amplitude.

4. The pane according to claim 1, wherein the sinusoidal decoated regions in each of said regions have a uniform amplitude and/or frequency.

5. The pane according to claim 1, wherein a line width of the decoated regions is from 5 µm to 500 µm.

6. The pane according to claim 5, wherein the line width of the decoated regions is from 10 µm to 140 µm.

7. The pane according to claim 1, wherein the transparent, electrically conductive coating has at least four zones.

8. The pane according to claim 7, wherein the transparent, electrically conductive coating has at least 10 to 150 zones.

9. The pane according to claim 7, wherein the at least four zones are arranged horizontally and/or vertically.

10. The pane according to claim 1, wherein the area of the zones has an area proportion of 25% to 95% of the pane.

11. The pane according to claim 1, wherein the first pane and/or a second pane contains glass or polymers.

12. The pane according to claim 11, wherein the glass is flat glass, float glass, quartz glass, borosilicate glass, soda lime glass, or the polymers are polyethylene, polypropylene, polycarbonate, polymethyl methacrylate, and/or mixtures thereof.

13. The pane according to claim 1, wherein the transparent, electrically conductive coating contains at least one metal and/or at least one metal oxide layer and/or carbon nanotubes and/or optically transparent, electrically conductive polymers and/or the transparent, electrically conductive coating has a sheet resistance from 0.35 ohm/square to 200 ohm/square.

14. The pane according to claim 13, wherein the at least one metal is silver, nickel, chromium, niobium, tin, titanium, copper, palladium, zinc, gold, cadmium, aluminium, silicon, tungsten, or alloys thereof, the at least one metal oxide layer is tin-doped indium oxide (ITO), aluminium-doped zinc oxide (AZO), fluorine-doped tin oxide (FTO, $SnO_2$:F), antimony-doped tin oxide (ATO, $SnO_2$:Sb), the optically transparent, electrically conductive polymers are poly(3,4-ethylenedioxythiophenes), polystyrene sulfonate, poly(4,4-dioctyl cylopentadithiophene), 2,3-dichloro-5,6-dicyano-1,4-benzoquinone, mixtures and/or copolymers thereof.

15. A laminated pane comprising:
a pane according to claim 1, and
a second pane, which is laminarily bonded to the pane via at least one intermediate layer.

16. A method comprising providing a glazing with low transmission attenuation for high-frequency electromagnetic radiation and including a pane according to claim 1, in a vehicle body or a vehicle door of a means of transportation on land, on water, or in the air, in buildings as part of an external façade or a building window and/or as a built-in part in furniture and appliances.

17. A method for producing a pane that includes at least one first pane with an outer side and an inner side, at least one transparent, electrically conductive coating, which is arranged on the outer side and/or on the inner side of the first pane, and at least one pattern, which is formed by decoated, linear regions within the transparent, electrically conductive coating such that the decoated linear regions are partially in contact with one another and, as a result, form a plurality of electrically isolated zones within the at least one transparent, electrically conductive coating, wherein the decoated linear regions have a sinusoidal shape, wherein the pane has regions with different amplitude and/or frequency of the sinusoidal decoated regions, and wherein in a central region, the sinusoidal decoated regions have a greater amplitude and/or a lower frequency than in an edge region, the method, comprising:
a. applying the transparent, electrically conductive coating on the outer side and/or the inner side of the first pane, and
b. introducing at least one electrically isolated zone with at least two linear decoated regions into the transparent, electrically conductive coating, wherein the at least two linear decoated regions are partially in contact with one another and have a sinusoidal shape.

18. The method for producing a pane according to claim 17, wherein the linear decoated regions are introduced by laser patterning into the transparent, electrically conductive coating.

19. The method for producing a pane according to claim 17, wherein in step (a), the transparent, electrically conductive coating is applied on a carrier layer and the carrier layer is laminarily bonded to the first pane.

* * * * *